United States Patent [19]

Yokose et al.

[11] Patent Number: 4,739,669
[45] Date of Patent: Apr. 26, 1988

[54] DRIVING APPARATUS FOR INDUSTRIAL ROBOT

[75] Inventors: Kazutoshi Yokose; Yutaka Makishima; Masatoshi Higake; Toshimi Shioda; Masahide Nagai; Minoru Noda, all of Tokyo, Japan

[73] Assignee: Seiko Instruments & Electronics Ltd., Tokyo, Japan

[21] Appl. No.: 809,938

[22] Filed: Dec. 17, 1985

[30] Foreign Application Priority Data

Dec. 17, 1984 [JP] Japan ................. 59-265652

[51] Int. Cl.[4] .................... F16H 29/02; F16H 29/20
[52] U.S. Cl. ..................... 74/89.15; 74/424.8 R; 384/519; 384/616
[58] Field of Search .............. 74/89.15, 424.8 R; 248/405, 544, 656; 384/519, 616

[56] References Cited

U.S. PATENT DOCUMENTS

| | | | |
|---|---|---|---|
| 2,704,693 | 3/1955 | Schwan | 384/519 |
| 2,817,979 | 12/1957 | Dean | 74/424.8 R |
| 3,069,924 | 12/1962 | Watanabe et al. | 74/424.8 R |
| 3,559,496 | 2/1971 | Betzing | 74/89.15 |
| 3,650,583 | 3/1972 | Itin et al. | 384/616 X |
| 3,792,619 | 2/1974 | Cannon et al. | 74/89.15 |
| 3,805,629 | 4/1974 | Martin et al. | 74/89.15 |
| 4,517,853 | 5/1985 | Tani et al. | 74/89.15 |

FOREIGN PATENT DOCUMENTS

| | | | |
|---|---|---|---|
| 1189351 | 3/1965 | Fed. Rep. of Germany | 74/424.8 R |
| 132944 | 8/1982 | Japan | 74/89.15 |
| 394347 | 6/1933 | United Kingdom | 384/519 |

Primary Examiner—Rodney H. Bonck
Assistant Examiner—Richard M. Lorence
Attorney, Agent, or Firm—Bruce L. Adams; Van C. Wilks

[57] ABSTRACT

A driving apparatus for effecting linear movement of an industrial robot comprises a slide member axially slidably disposed within a frame, a ball nut secured to the slide member and a ball screw threaded through the ball nut and rotationally driven relative to the ball nut to effect linear movement of the ball nut along the ball screw accompanied by linear movement of the slide shaft. A bracket is adjustably mounted on the frame for rotatably supporting the shaft of the ball screw. The bracket can be displaced relative to the frame in the transverse direction of the slide member to align the axis of the ball screw with the axis of the slide member during assembly of the apparatus. A thrust bearing is disposed between the shaft of the ball screw and the bracket to absorb radial displacement and strain of the ball screw shaft.

6 Claims, 2 Drawing Sheets

4,739,669

DRIVING APPARATUS FOR INDUSTRIAL ROBOT

BACKGROUND OF THE INVENTION

This invention relates to a driving apparatus for an industrial robot, especially to a ball screw sustaining or supporting construction which allows to easily carry out the assembly thereof.

In a conventional apparatus of this kind such as disclosed in U.S. Pat. No. 3,805,629, the one end of the ball screw for driving the slide shaft is rotatably mounted on a bracket which is fixedly mounted on the end of the frame.

This invention is intended to settle the problems as effectively as possible, wherein the bracket for rotatably mounting one end of the ball screw shaft is mounted on the frame so as to effect a fine adjustment in the radial direction of the ball screw and further, the bearings having the flexibility to the radial displacement are interposed between the bracket and one end of the ball screw shaft.

According to these features, the bracket is adjustably secured to the frame so as to be adequately displaced to align the center of the ball screw with the center of the slide shaft whereby even if the displacement occurs, by means of the thrust bearing and the like provided between the ball screw shaft and the bracket, the transverse or radial displacement and strain in the ball screw sustaining portion can be absorbed.

BRIEF DESCRIPTION OF THE DRAWINGS

The drawings show an embodiment of this invention, wherein.

DETAILED DESCRIPTION OF THE INVENTION

In conjunction with the drawings, one embodiment of this invention will be described in detail.

Figure 1:
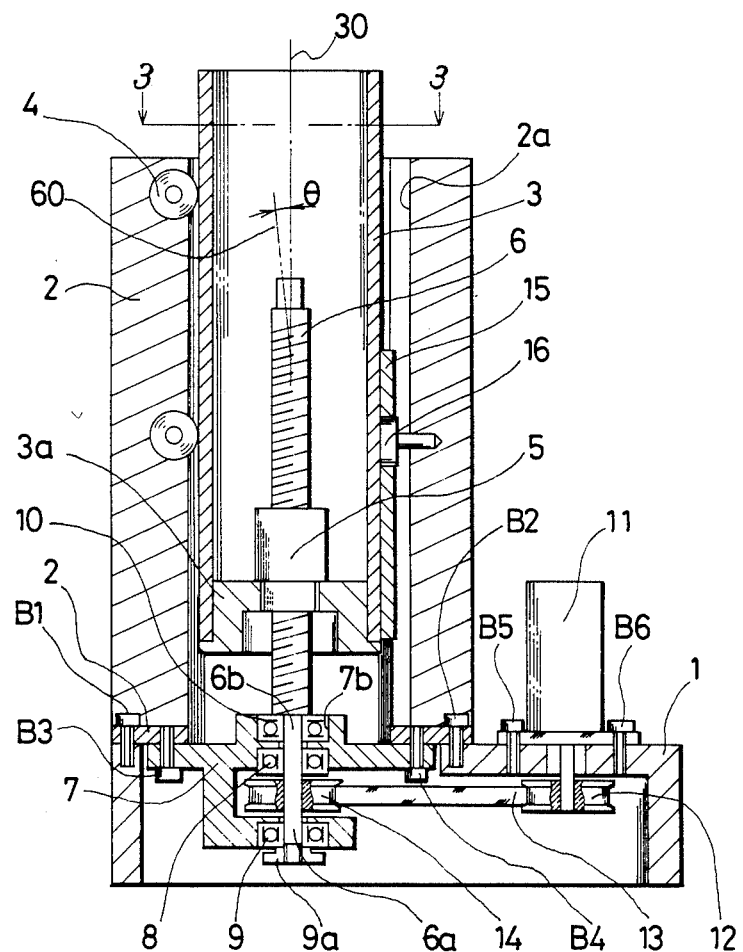
FIG. 1 is a side view.
Figure 2:
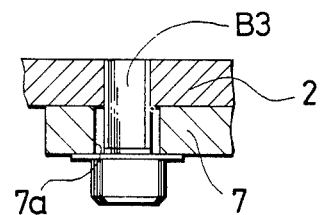
FIG. 2 is an enlarged cross-sectional view of the sustaining portion of the bracket and FIG. 3 is a plain view which shows an arrangement of a roller follower of the slide shaft.
Figure 3:
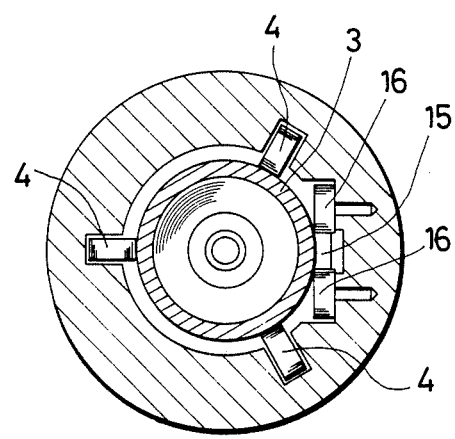

FIG. 1 shows a cross-sectional side view of an embodiment suitable for the invention. In the drawing, 1 is a base and 2 is a frame which is secured to the base 1 as a whole by means of bolts $B_1$, $B_2$. 3 is a cylindrically-shaped hollow slide shaft or member which is slidably disposed within the frame 2, on the driving end of which an industrial robot apparatus and a manipulator and the like (not shown) are arranged to undergo linear movement. 4 is a plurality of roller followers, each of which is rotationally mounted within the frame 2 and the outer circumferential surface of which abuts on the slide shaft 3 so as to function as bearing. 5 is a ball nut which is fixedly mounted in the slide shaft or member 3 via a bracket 3a. 6 is a ball screw which is insertably threaded through the ball nut 5 and extends axially inside the slide shaft. 7 is a bracket which is secured to the frame 1 by means of bolts $B_3$ and $B_4$. The bolts $B_3$ and $B_4$, as shown in FIG. 2, pass through a large through-hole 7a of the bracket 7 and are secured to the frame 2. Accordingly, the bracket 7 is movably adjustable relative to the frame 2 by the clearance between the bolts $B_3$ and $B_4$ and the large hole 7a. 8 and 9 are respectively radial bearings which are disposed in the bracket 7 so as to rotatably receive therein the ball screw shaft 6a and firmly pivotally mount the ball screw shaft 6a together with a bearing nut 9a. 10 is a thrust bearing which is interposed between the inside surface of the recess 7b of the bracket 7 (the surface parallel to the periphery of the frame 2) and the end portion 6b of the ball screw shaft 6a adjacent to the rear end of the ball screw 6, but if an angular bearing has some flexibility in the radial direction of the ball screw shaft 6a, the angular bearing can be used in place of the thrust bearing. 11 is a motor which is fixedly mounted on the base 1 via bolts $B_5$ and $B_6$ and rotatably drives the ball screw 6 in opposite directions via a pulley 12 which is fixedly engaged with the motor shaft, a timing belt 13 and a pulley 14 which is fixedly mounted around the ball screw shaft 6a. 15 is a cross-sectionally rail-shaped stopper or longitudinal element which is fixedly mounted on the outer peripheral portion of the slide shaft 3 by means of bolts (not shown). 16 is a cam follower which is rotatably mounted within the frame 2 and guides the stopper 15 in such a manner that the pair of cam followers receive therebetween the stopper 15 to press the same at both sides thereof, as shown in FIG. 3. The frame 2 is provided with a groove 2a for removing the stopper 15.

The operation of the apparatus of this invention will be described hereinafter.

The slide shaft 3 is, as well known, guided by the roller follower 4 and cam follower 16 such that it is vertically axially driven by the drive torque of the motor 11 without undergoing rotation.

But, if the bracket 7 were unadjustably fixed to the frame, it would be difficult to perfectly align the center axis 30 of the slide shaft 3 with the center axis 60 of the ball screw 6 because the inclination angle $\theta$ sometimes occurs due to the displacement between both axes.

But, the thrust bearing 10 is intermediately provided in the recess 7b of the bracket 7 such that the transverse or radial displacement and strain, which occurs in the end portion 6b of the ball screw shaft 6a due to the displacement thereof, can be absorbed. Accordingly, the stress which is applied to the outer peripheral surface of the slide shaft 3 by the roller follower 4 and the cam follower 16 is averaged.

Besides, in assembling of this apparatus, the slide shaft 3 is inserted from the upper opening of the frame 2 as shown in FIG. 1 and the ball screw 6 is inserted from the lower opening so as to thread through the ball nut 5 and thereafter, the bracket 7 is adjustably mounted on the frame 2. Accordingly, the slide shaft 3 and the ball screw 6 can be easily assembled from the upper and/or lower openings respectively. Besides, in mounting, the brackt 7 can be adjusted so as to match the center of the slide shaft 3 with the center of the ball screw 6 by moving the bracket a little relative to the frame by the clearance of the large hole 70.

As set forth above, according to this invention, the ball screw is caused to be adjustable in the radial direction by mounting the ball screw on the frame so as to enable a fine adjustment in the radial direction of the ball screw. The bracket pivotally supports one end of the ball screw shaft on the frame, and further, bearings having sufficient radial flexibility so as to undergo radial displacement are interposed between the bracket and one end of the ball screw shaft connected to the ball screw such that in mounting the ball screw within the slide shaft, the ball screw can be easily assembled from the frame opening. Further, it becomes possible to absorb the transverse or radial displacement and strain which occurs in the sustaining portion of the ball screw due to the displacement between the center line of the slide shaft and the center line of the ball screw by means of the radial flexibility of the bearings. Therefore, it becomes possible to provide an industrial robot which is easily assembled without affecting the axial drive of the slide shaft.

What is claimed is:

1. A driving apparatus for effecting linear movement comprising: a frame; a hollow slide member axially slidably disposed within the frame to undergo linear movement; a ball nut secured to the inside of the slide member; a ball screw extending axially inside the slide member and being threadedly engaged with the ball nut and having a ball screw shaft extending axially therefrom; driving means connected to the ball screw shaft for rotationally driving the ball screw relative to the ball nut to thereby effect linear movement of the ball nut axially along the ball screw accompanied by linear movement of the slide member; and supporting means for rotatably supporting the ball screw shaft, the supporting means being adjustably secured to the frame to enable the supporting means to be displaced relative to the frame in the transverse direction of the slide member to effect alignment of the axis of the ball screw with the axis of the slide member during assembly of the apparatus, the supporting means comprising a bracket for supporting therein the ball screw shaft, a bolt for securing the bracket to the frame, and means defining a through-hole in the bracket for receiving therethrough the bolt, the through-hole being dimensioned to define a clearance for the bolt to enable adjustable displacement of the bracket relative to the frame.

2. A driving apparatus according to claim 1; wherein the supporting means includes bearing means for rotatably receiving therein the ball screw shaft.

3. A driving apparatus according to claim 2; wherein the bearing means has sufficient flexibility in the radial direction of the ball screw shaft so that the bearing means absorbs radial displacement and strain of the ball screw shaft.

4. A driving apparatus according to claim 3; wherein the bearing means comprises a thrust bearing.

5. A driving apparatus according to claim 1; including guiding means disposed between the frame and the slide member for guiding the linear movement of the slide member.

6. A driving apparatus according to claim 5; wherein the guiding means comprises a longitudinal element extending axially of and being secured to the outer periphery of the slide member, and a cam follwer rotatably mounted at the inner periphery of the frame for slidably receiving therein the longitudinal element.

* * * * *